(12) United States Patent
Kobayashi et al.

(10) Patent No.: US 7,160,353 B2
(45) Date of Patent: Jan. 9, 2007

(54) PROCESS FOR PRODUCING MOLTEN IRON

(75) Inventors: Isao Kobayashi, Hyogo (JP); Itsuo Miyahara, Hyogo (JP); Hidetoshi Tanaka, Hyogo (JP); Koji Tokuda, Hyogo (JP)

(73) Assignee: Kabushiki Kaisha Kobe Seiko Sho (Kobe Steel, Ltd.), Kobe (JP)

( * ) Notice: Subject to any disclaimer, the term of this patent is extended or adjusted under 35 U.S.C. 154(b) by 413 days.

(21) Appl. No.: 10/479,584

(22) PCT Filed: Jan. 16, 2003

(86) PCT No.: PCT/JP03/00298

§ 371 (c)(1),
(2), (4) Date: Dec. 4, 2003

(87) PCT Pub. No.: WO03/062474

PCT Pub. Date: Jul. 31, 2003

(65) Prior Publication Data

US 2004/0168549 A1  Sep. 2, 2004

(30) Foreign Application Priority Data

Jan. 24, 2002 (JP) ............................. 2002-015741
Oct. 2, 2002 (JP) ............................. 2002/290389

(51) Int. Cl.
*C21B 15/00* (2006.01)
(52) U.S. Cl. ............................. 75/502; 75/501; 75/500
(58) Field of Classification Search .................. 75/500, 75/501, 502
See application file for complete search history.

(56) References Cited

U.S. PATENT DOCUMENTS 3,443,931 A   5/1969  Beggs et al.
4,701,214 A  10/1987  Kaneko et al.
5,401,295 A   3/1995  Brotzmann
5,480,473 A   1/1996  Hardie et al.
5,885,521 A   3/1999  Meissner et al.
5,989,019 A  11/1999  Nishimura et al.

(Continued)

FOREIGN PATENT DOCUMENTS

CN          1086545 A    5/1994

(Continued)

*Primary Examiner*—Scott Kastler
(74) *Attorney, Agent, or Firm*—Oblon, Spivak, McClelland, Maier & Neustadt, P.C.

(57) ABSTRACT

A method for making molten iron includes the steps of feeding a raw material mixture containing an iron oxide material and a carbonaceous reductant into a heating reduction furnace to reduce iron oxide in the raw material mixture with the carbonaceous reductant into solid reduced iron; transporting the solid reduced iron to a melting furnace; and combustion of a carbonaceous material supplied as fuel to melt the solid reduced iron in the melting furnace for producing molten iron. After the metallization of the solid reduced iron is enhanced to at least 60%, the solid reduced iron is transported to the melting furnace. The amounts of oxygen and the carbonaceous material supplied to the melting furnace are controlled so that the secondary combustion ratio of CO gas in the melting furnace is reduced to 40% or less. The heat transfer efficiency of the secondary combustion heat to the molten iron is preferably increased to at least 60%.

24 Claims, 4 Drawing Sheets

U.S. PATENT DOCUMENTS

| | | |
|---|---|---|
| 6,015,527 A | 1/2000 | Kamei et al. |
| 6,063,156 A | 5/2000 | Negami et al. |
| 6,126,718 A | 10/2000 | Sawa et al. |
| 6,129,777 A | 10/2000 | Fuji et al. |
| 6,149,709 A | 11/2000 | Uragami et al. |
| 6,152,983 A | 11/2000 | Kamijo et al. |
| 6,241,803 B1 | 6/2001 | Fuji |
| 6,251,161 B1 | 6/2001 | Tateishi et al. |
| 6,254,665 B1 | 7/2001 | Matsushita et al. |
| 6,258,149 B1 | 7/2001 | Sugiyama et al. |
| 6,284,017 B1 | 9/2001 | Kamei et al. |
| 6,296,479 B1 | 10/2001 | Nishimura et al. |
| 6,302,938 B1 | 10/2001 | Kamijo et al. |
| 6,319,302 B1 | 11/2001 | Harada |
| 6,334,883 B1 | 1/2002 | Takenaka et al. |
| 6,368,379 B1 | 4/2002 | Tateishi et al. |
| 6,413,295 B1 | 7/2002 | Meissner et al. |
| 6,419,724 B1 | 7/2002 | Monteyne |
| 6,500,381 B1 | 12/2002 | Harada |
| 6,503,289 B1 | 1/2003 | Tanigaki et al. |
| 6,506,231 B1 | 1/2003 | Negami et al. |
| 6,511,316 B1 | 1/2003 | Harada et al. |
| 6,517,770 B1 | 2/2003 | Tateishi et al. |
| 6,521,171 B1 | 2/2003 | Tateishi et al. |
| 6,569,223 B1 | 5/2003 | Tanigaki et al. |
| 6,579,505 B1 | 6/2003 | Tsuchiya et al. |
| 6,585,800 B1 | 7/2003 | Sugitatsu et al. |
| 6,592,647 B1 | 7/2003 | Hino et al. |
| 6,592,649 B1 | 7/2003 | Kikuchi et al. |
| 6,602,320 B1 | 8/2003 | Fuji et al. |
| 6,630,010 B1 | 10/2003 | Ito et al. |
| 6,837,916 B1 | 1/2005 | Kawakami et al. |

FOREIGN PATENT DOCUMENTS

| | | | |
|---|---|---|---|
| CN | 1207139 A | | 2/1999 |
| CN | 1248632 A | | 3/2000 |
| EP | 0563559 | | 10/1993 |
| EP | 0592830 | | 4/1994 |
| JP | 62-230924 | | 10/1987 |
| JP | 402073911 A | * | 3/1990 |
| JP | 402104608 A | * | 4/1990 |
| JP | 3-60883 | | 9/1991 |
| JP | 6-088143 | | 3/1994 |
| JP | 6-212225 | | 8/1994 |
| JP | 11-029806 | | 2/1999 |
| JP | 11-217614 | | 8/1999 |
| JP | 2000-119719 | | 4/2000 |
| JP | 2001-247920 | | 9/2001 |
| JP | 2001-279313 | | 10/2001 |
| KR | 2000-0062353 | | 10/2000 |
| KR | 2001-0032730 | | 4/2001 |
| RU | 2 096 483 C1 | | 11/1997 |
| RU | 2 105 069 | | 2/1998 |
| SU | 1674694 A3 | | 8/1991 |
| WO | 99/34022 | | 7/1999 |

* cited by examiner

PROCESS FOR PRODUCING MOLTEN IRON

TECHNICAL FIELD

The present invention relates to methods for making molten iron. In particular, the present invention relates to a method for effectively making high-purity molten iron by thermal reduction of iron oxide materials such as iron ore with carbonaceous reductants such as carbonaceous materials.

BACKGROUND ART

Nowadays, molten iron is produced by reduction of iron oxide materials such as iron ore by blast furnace-converter processes in the main. This process absolutely requires coke as a reductant. Furthermore, the process makes economics of scale a priority; hence, the process cannot meet limited production of diversified products upon a change in economic trend.

Direct ironmaking processes such as a MIDREX process are suitable for limited production of diversified products. Unfortunately, these processes use natural gas as a reductant; hence, the sites for constructing plants are limited.

Another method for making molten iron is a SL/RN process that includes production of reduced iron with coal-based carbonaceous reductants and melting of the reduced iron in an electric furnace. Many direct ironmaking processes have also been reported in which a rotary hearth furnace and an electric melting furnace are combined for integration of reduction of iron oxide and melting of the reduced iron. Since these processes consume a great deal of electric power, construction of plants is limited to sites to which electric power can be easily supplied.

Under such circumstances, improvements in smelting reduction process that produces molten iron using iron sources such as iron ore and carbonaceous reductants such as coal have been intensively studied. Typical examples of the processes are a DIOS process and a HIsmelt process using a combination of a prereduction furnace and a smelting reduction furnace. Key points in practical use of these processes are a high secondary combustion ratio and high heat transfer efficiency in the smelting reduction furnace. However, in such conditions, slag, which is produced as by-product during smelt reduction from gangue components in iron sources such as iron ore, inevitably contains a high content of iron oxide (FeO). The iron oxide significantly erodes lining refractory of the furnace. A proposed method includes water-cooling of the furnace to suppress the erosion of the refractory. This proposed method, however, has large heat loss from the furnace, significantly reducing the productivity of molten iron and thermal energy efficiency.

One of the direct ironmaking processes includes heating of carbonaceous agglomerates (pellets or briquettes), which are shaped mixtures of iron sources such as iron ore and carbonaceous reductants such as carbonaceous materials, in a rotary furnace to reduce the iron sources and reduction of the product in a smelting reduction furnace. This process introduces hot exhaust gas generated in the smelting reduction furnace into the rotary furnace and uses the heat of the exhaust gas in the smelting reduction furnace to enhance the overall heat efficiency of the facilities. However, the hot exhaust gas from the smelting reduction furnace contains a large amount of dust that is deposited not only on the inner walls of pipes but also on the walls of the rotary furnace, inhibiting a stable continuous operation.

This process has another problem. If thermal fluctuation occurs in the smelting reduction furnace, the heat quantity of the hot gas supplied to the rotary furnace and the reduction potential vary, resulting in an unstable operation of the facilities. Such an unstable operation causes changes in reduction efficiency of iron oxide and metallization in the rotary furnace. As a result, the produced iron does not have constant purity. Furthermore, the byproduct slug contains an increased amount of iron oxide (FeO), which erodes the hearth refractory.

In addition, in the smelting reduction process, large amounts of oxygen and heat are supplied into the smelting reduction furnace. Thus, maintenance of furnace refractory and the tuyere is essential by using equipment for tilting and moving the furnace, resulting in increased production costs of molten iron.

DISCLOSURE OF INVENTION

An object of the present invention is to provide a method for effectively making high-purity molten iron from a mixture of iron oxide and a carbonaceous reductant with minimized erosion of a rotary hearth furnace and a melting furnace refractory by adequately controlling operation conditions in a molten iron production process that uses a combination of a rotary hearth furnace and a melting furnace.

A method for making molten iron according to the present invention includes the steps of feeding a raw material mixture containing an iron oxide material and a carbonaceous reductant into a heating reduction furnace to reduce iron oxide in the mixture with the carbonaceous reductant into solid reduced iron; transporting the solid reduced iron to a melting furnace; and combustion of a carbonaceous material supplied as fuel to melt the solid reduced iron in the melting furnace for producing molten iron, wherein after the metallization of the solid reduced iron is enhanced to at least 60%, the solid reduced iron is transported to the melting furnace, and the amounts of oxygen and the carbonaceous material supplied to the melting furnace are controlled so that the secondary combustion ratio of CO gas in the melting furnace is reduced to 40% or less.

The secondary combustion ratio in the melting furnace in the present invention is calculated from the analytical concentrations of exhaust gases from the melting furnace by the following formula:

$$\text{Secondary combustion ratio} = 100 \times (CO_2 + H_2O)/(CO + CO_2 + H_2 + H_2O)$$

The heat transfer efficiency is calculated from the observed temperatures of the gas and the molten iron discharged from the melting furnace and the above secondary combustion ratio.

In the raw material mixture used in the present invention, the carbon content (A), excluding volatile components, in the carbonaceous reductant and the carbonaceous material is preferably equal to or higher than the sum of the chemical equivalent necessary for reduction of iron oxide in the mixture, a target carbon content in the molten iron product, and an amount corresponding to the heat quantity necessary for melting of the solid reduced iron. In such a condition, a series of steps including solid reduction of iron oxide in the raw material mixture, reduction, melting, and preparation of molten metallic iron can be smoothly performed with high efficiency.

The carbon content (A) may be adjusted by at least one of the carbonaceous reductant compounded in the raw material mixture to be fed into the heating reduction furnace, a carbonaceous reductant compounded in the reduced iron that is produced in the heating reduction furnace, and the carbonaceous material supplied to the melting furnace.

An oxygen-containing gas supplied to the melting furnace is preferably high-purity oxygen gas containing at least 90% oxygen, which enhances secondary combustion ratio in the melting furnace, facilitates control of the combustion temperature in the secondary combustion and the heat transfer efficiency to the molten iron bath, and reduces exhaust gas and thus dust generation. The high-purity oxygen gas may be supplied to the melting furnace by bottom blowing, top blowing, side blowing, or combination thereof. Top blowing and side blowing of the high-purity oxygen gas toward a slag layer preferably enhances the combustion efficiency of the added carbonaceous material in the slag layer, resulting in enhanced heat transfer efficiency. Preferably, the heat transfer efficiency of the secondary combustion heat to the molten iron is increased to at least 60%.

The melting furnace may be of a stationary (i.e. non-tilting) type or a tilting type. A preferable process for facilitating reduction melting by simple operations includes feeding the solid reduced iron, the carbonaceous material, and a flux for adjusting the slag compositions from the top of the melting furnace by gravity. Preferably, in the melting furnace, inert gas is injected into the molten iron to agitate the molten iron. Melting of the solid reduced iron is further facilitated and the processing time is reduced.

In case of use of the stationary melting furnace, preferably a tap hole is provided in a sidewall for discharging molten iron and molten slag at a height from which the inert gas cannot be blown over slag layer. Clogging of the tuyere due to gas blowing is thereby prevented.

The iron oxide material used in the present invention is generally iron ore, and may be mill scales; iron oxide-containing dust i.e., blast furnace dust and converter furnace dust; and iron oxide containing nonferrous metal or its oxide, i.e., ore containing nonferrous metals, such as nickel, chromium, manganese, and titanium and oxides thereof, and dust and slag discharged from metal refining facilities. These nonferrous metals and oxides thereof may be allowed to be transferred to slag that is generated during producing the molten iron so that high-purity nonferrous metals and nonferrous metal oxides are recovered as products or raw materials.

In the process of melting the solid reduced iron in the melting furnace, the molten metallic iron contains a considerable amount of sulfur, which is derived from carbonaceous materials. In this process, preferably, an adequate amount of CaO-containing material is added such that the basicity ($CaO/SiO_2$) of the slag formed in the melting furnace is at least 1.2. Thereby, the sulfur transferred to the molten slag is readily increased, resulting in a reduction in sulfur content in metallic iron. Preferably, the amount of the carbonaceous material fed into the melting furnace is adjusted such that the carbon content in the molten metallic iron is at least 2%. The sulfur partition ratio in the slag is thereby increased to further reduce the sulfur content in the molten iron.

The solid reduced iron produced in the heating reduction furnace is directly fed into the melting furnace while maintaining high temperature. Thus, the heat of the solid reduced iron is effectively used for melting the solid reduced iron. By occasion of restriction of the facilities, the solid reduced iron may be temporarily stored in a yard and then may be fed into the melting furnace.

In the above process, the combustion gas generated in the melting furnace has a considerable amount of heat. The heat may be used as a heat source in the heating reduction furnace. In such a case, the combustion gas is cooled and subjected to dust removal to reduce the dust volume in the gas to 5 $g/Nm^3$ or less. Deposition of dust on the inner faces of pipes and on the walls of the heating reduction furnace is thereby prevented. Preferably, the exhaust gas from the heating reduction furnace is used for preheating of air. The hot air is used as at least one of combustion air in the heating reduction furnace, drying of the raw material mixture, and drying of the iron oxide material and the carbonaceous reductant to enhance overall heat efficiency of the process.

BEST MODE FOR CARRYING OUT THE INVENTION

Embodiments of the present invention will now be described in detail with reference to the drawings. As many different embodiments of the present invention may be made without departing from the spirit and scope thereof, it is to be understood that the invention is not limited to the specific embodiments.

Figure 1:
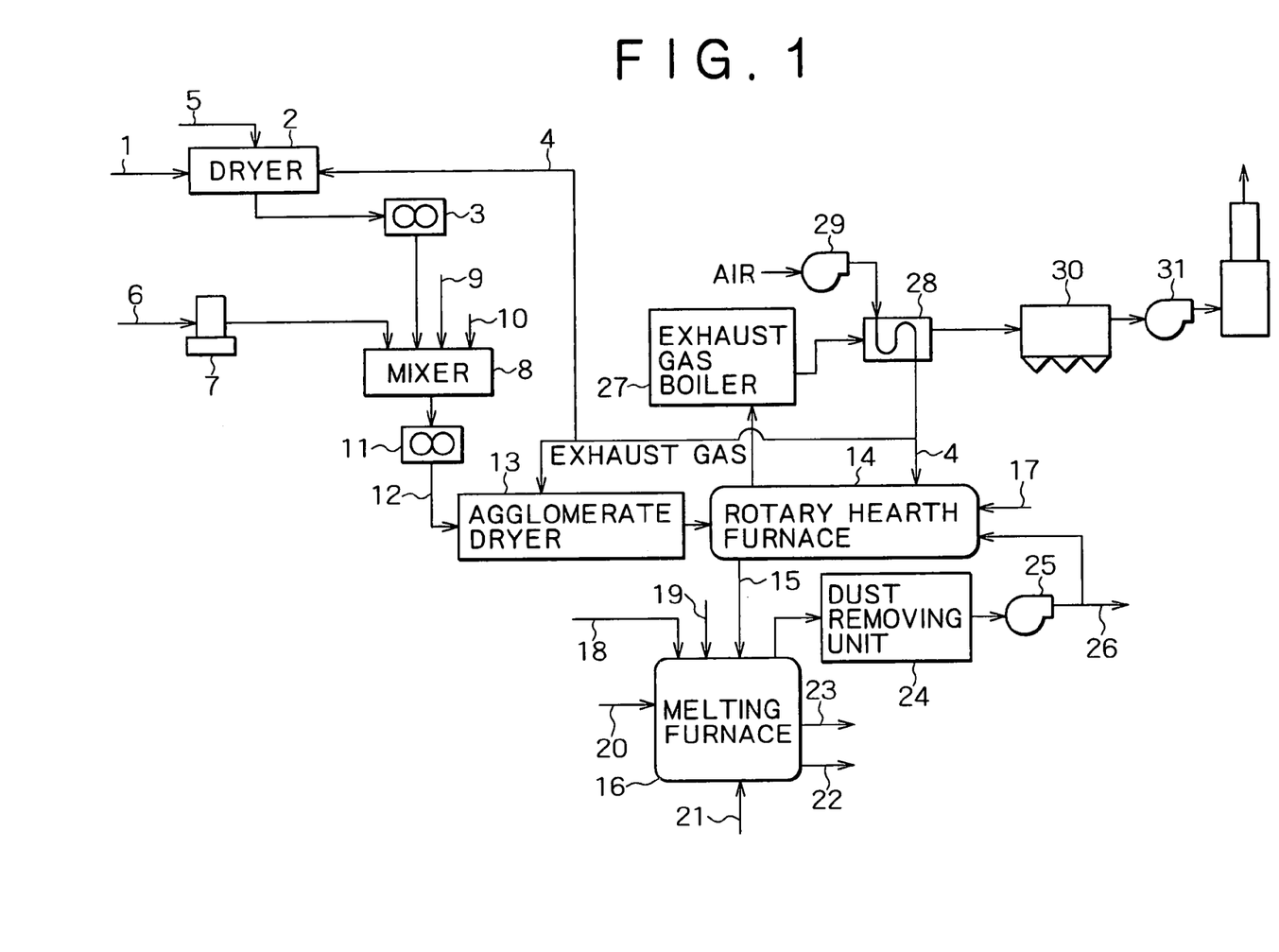
FIG. 1 is a flow chart of an overall system according to an embodiment of the present invention.

FIG. 1 is a flow chart of an overall system according to an embodiment of the present invention. Iron ore 1 as an iron source is preferably fine ore having a particle size of about 8 mm or less. The iron ore 1 is dried in a dryer 2 and is pulverized in an ore mill 3. The dryer 2 uses air 4 as a heat source that is preheated by heat exchange with the sensible heat of the exhaust gas from a rotary hearth furnace 14 and additional heat from auxiliary fuel 5, if necessary. Coal 6 used as a carbonaceous reductant is pulverized in a coal mill 7 and fed into a mixer 8. In the mixer 8, the pulverized iron ore 1, the milled coal 6, and optionally a binder 9 and an adequate amount of water are mixed and are shaped into agglomerates 12, such as solid spheres, grains, pellets, or briquettes, in an agglomeration machine 11. In this step, auxiliary materials 10 such as alumina, silica, and calcia may be used. The auxiliary materials 10 are consumed in smelting reduction in a melting furnace. The auxiliary material 10 may be added alone or in combination.

In this embodiment, the raw material mixture is shaped into agglomerates. In the present invention, the use of such agglomerates is most preferable and the embodiments using the agglomerates will be described below. In place of the agglomerates, however, a powdered mixture, or a lightly compacted mixture may be used in the present invention. A typical iron source is iron ore. Blast furnace dust and mill scales, which contain iron oxide, may be used together with the iron ore. In addition, other materials containing iron oxide and nonferrous metals and corresponding oxides, such as dust generated from metal refining facilities, may be used.

When carbonaceous materials such as coal 6 are used as carbonaceous reductants, volatile components contained in the carbonaceous materials vaporize above 600° C. and substantially do not contribute to reduction of iron oxide. Thus, on the basis of the carbon content, excluding the volatile carbon content, in the carbonaceous material, the amount of the carbonaceous material used in the present invention is determined by the sum of the chemical equivalent necessary for reduction of iron oxide, a target carbon content in the molten iron product, the heat quantity necessary for melting of the solid reduced iron in the melting furnace, and a small excessive amount corresponding to loss in the process.

The agglomeration machine 11 used in production of the agglomerates 12 is, for example, a pelletizing or briquetting machine. Preferably, the agglomerates 12 have a bulk density of at least 1.2 g/cm$^3$ and more preferably at least 1.8 g/cm$^3$. This bulk density is determined such that heat transmitted to the surfaces of the agglomerates 12 rapidly enters the interior of the agglomerates 12 in a heating reduction furnace (rotary hearth furnace).

Preferably, the agglomerates 12 are dried in an agglomerate dryer 13 into a moisture content of 1% or less and are fed to a rotary hearth furnace 14 (heating reduction furnace). Drying air 4 used in this process is preferably preheated by heat exchange with the sensible heat of the exhaust gas from the rotary hearth furnace 14 to effectively utilize the exhaust heat. Preferably, the temperature of the drying air 4 is about 200° C. or less to prevent explosive fracture of the agglomerates 12 caused by sudden volatilization of water. The dried agglomerates 12 are consecutively fed into the rotary hearth furnace 14 for smelt reduction.

Preferably, the metallization of reduced iron 15 formed by smelt reduction is at least 60%, more preferably at least 80%, and most preferably at least 90% that correspond to the heat of fusion of scraps, as described below with reference to FIG. 2. Reducing gas discharged from a melting furnace 16 is used as fuel for the smelt reduction. The reducing gas is burned at a burner provided on the sidewalls of the rotary hearth furnace 14 to heat the agglomerates 12.

In order to maintain the above metallization of the reduced iron 15 in the heat reduction step, the combustion state of the burner must be always stable. Preferably, the exhaust gas from the melting furnace 16 is cooled and subjected to dust removal to reduce the dust volume in the gas to 5 g/Nm$^3$ or less and more preferably 1 g/Nm$^3$ or less. Furthermore, natural gas or powdered coal is preferably stocked as additional fuel 17, which is used in an initial stage of the operation of the facilities and in thermal compensation for the rotary hearth furnace 14.

In the rotary hearth furnace 14, CO gas generated by the reactions represented by formulae (2) and (4) below is subjected to secondary combustion in the presence of the preheated drying air 4, as represented in formula (1):

$$CO+1/2O_2 \rightarrow CO_2 \qquad (1)$$

This heat of reaction is used for heat reduction of the agglomerates 12. In this step, carbon monoxide is completely oxidized such that oxygen in the exhaust gas is substantially completely consumed. This means that the energy of the carbonaceous material is completely consumed in the rotary hearth furnace 14. Accordingly, this process has high energy efficiency.

The reduced iron 15 produced in the rotary hearth furnace 14 may be discharged to the exterior of the production line, but preferably, is fed into the melting furnace 16 as it is heated to enhance the heat efficiency. It is preferable that the reduced iron 15 be continuously fed from the top of the melting furnace 16 by gravity. In this step, a carbonaceous material 18 as a heat source for melting the reduced iron 15 and an auxiliary material 19 for slag control are also fed from the top of the melting furnace 16. Such top feeding facilitates maintenance of the feeding unit.

The carbonaceous material 18 are allowed to react (burned) with an oxygen source 20 in the melting furnace 16 to reduce iron oxide remaining in the reduced iron 15 and to melt the reduced iron for producing molten iron having a carbon content of preferably 2% or more, more preferably 2.5% to 4.5%.

Preferably, the amounts of the oxygen source 20 and the carbonaceous material 18 are controlled such that the secondary combustion ratio of CO gas generated in the melting furnace 16 is 40% or less, and more preferably in the range of 20% to 40%. As a result, the heat efficiency of the heat of the secondary combustion to the molten metal can be increased to at least 60%, more preferably at least 75%, and most preferably at least 80%. The reasons for limitation of these figures will be described below.

Preferably, the oxygen source 20 used is high-purity oxygen gas containing at least 90% oxygen, which is injected toward the slag layer on the molten metal in the melting furnace 16 by top blowing, side blowing, or bottom blowing to agitate the slag layer. Top blowing and side blowing of the high-purity oxygen gas are preferable to facilitate the maintenance of the tuyere. Furthermore, such blowing manner does not require tilting of the melting furnace 16; hence, the structure of the melting furnace can be simplified.

The use of high-purity oxygen gas containing at least 90% oxygen facilitates control of the secondary combustion ratio and calorie control of the reducing gas fed from the melting furnace 16 to the rotary hearth furnace 14, namely, necessary and sufficient control for maintaining a theoretical combustion temperature. Preferably, inert gas 21 is injected into the molten iron by bottom blowing to agitate the molten iron. Melting of the solid reduced iron 15 is further facilitated.

At least part or all of the carbonaceous material 18 fed into the melting furnace 16 and/or another carbonaceous material may be directly fed into the rotary hearth furnace 14, in addition to the agglomerates 12. These another carbonaceous materials may be fed as a hearth material on the hearth of the rotary hearth furnace 14, may be fed with the agglomerates 12 in the rotary hearth furnace 14, or may be fed in the rotary hearth furnace 14 after the agglomerates 12 are fed. The another carbonaceous materials may be powdered when they are used as the hearth material. However, the another carbonaceous materials are not necessarily powdered and may be agglomerates when they are simultaneously fed together with the agglomerates 12 or fed after the agglomerates 12 are fed, into the rotary hearth furnace 14. Since the volatile components in the another carbonaceous materials are vaporized and are used as a heating material, the volume of the additional fuel 17 is reduced.

The other carbonaceous material represents a different type from the carbonaceous material 18 fed into the melting furnace 16. For example, when the carbonaceous material 18 fed into the melting furnace 16 is coke, the other carbonaceous material is coal. Accordingly, the other carbonaceous material in the present invention does not necessarily represent a quite different type. In addition, the other carbonaceous material and the carbonaceous material 18 may be the same type.

The carbonaceous material is heated to be chared in the rotary hearth furnace 14 and is fed to the melting furnace for melting of the reduced iron. In this process, the volatile components of the carbonaceous material are removed and the heated char is fed into the melting furnace. Thus, the volume of the exhaust gas when the carbonaceous material is fed into the melting furnace is reduced compared with a case of use as the carbonaceous material 18 for the melting furnace, resulting in simplification of the exhaust gas facility and reduction in the volume of the exhaust gas 26. As in the carbonaceous material 18, the other carbonaceous material may be coal, wood chips, waste plastic, or waste tires. Alternatively, the other carbonaceous material may be coke, wood coal, or coke breeze not containing volatile components.

The melting furnace 16 is provided with a tap hole on a sidewall to discharge the molten iron 22 and molten slag 23. The tap hole is preferably provided at a height from which the inert gas 21 cannot be discharged. Preferably, the melting furnace 16 has an enclosed structure so that all or part of the gas generated in the melting furnace 16 is fed into the rotary hearth furnace 14 and is effectively used as a heat source. As shown in the drawing, the gas generated in the melting furnace 16 is cooled, fed into a dust removing unit 24 to reduce the dust volume to about 5 g/Nm³ or less and more preferably 1 g/Nm³ or less, and fed into the rotary hearth furnace 14. Deposition of dust on the inner faces of pipes and on the inner walls of the rotary hearth furnace 14 is thereby prevented. In order to effectively use the sensible heat of the exhaust gas from the heating reduction furnace 16, preferably, the sensible heat of the exhaust gas is recovered with, for example, a radiant heat transfer boiler that is provided at the outlet of the melting furnace 16 and is supplied to the dust-removing unit 24.

The gas is fed into a booster blower 25 for control of the pressure and is fed into the combustion burner of the rotary hearth furnace 14. Preferably, the excess gas 26 is discharged to the exterior and is used as fuel gas for adjacent facilities. Preferably, high-pressure oxygen is charged into the melting furnace 16 having an enclosed structure to pressurize the interior of the melting furnace 16. In such a process, the booster blower 25 is unnecessary.

The exhaust gas from the rotary hearth furnace 14 does not substantially have latent heat but still is at high temperature. Thus, the exhaust gas is preferably subjected to heat recovery in an exhaust gas boiler 27 and is used for preheating of air in a heat exchanger 28. The exhaust gas after heat recovery in the heat exchanger 28 is purified through a dust-removing unit 30 and is discharged into atmosphere through a suction fan 31. The suction fan 31 controls the internal pressure of the rotary hearth furnace 14.

The method of the present invention is performed according to the above process flow. The operation conditions of the rotary hearth furnace 14 and the melting furnace 16 will now be described in further detail, because these conditions are particularly important in the present invention.

First, the rotary hearth furnace 14, a main component of the reduced iron making facilities, will be described. When a mixture of an iron oxide-containing material and a carbonaceous reductant or preferably agglomerates of the mixture are fed into and heated in the rotary hearth furnace, reactions represented by formulae (2) to (4) proceeds:

$$Fe_mO_n + nC \rightarrow mFe + nCO \qquad (2)$$

$$Fe_mO_n + nCO \rightarrow mFe + nCO_2 \qquad (3)$$

$$C + CO_2 \rightarrow 2CO \qquad (4)$$

Iron oxide is thereby reduced. The amount of CO and $CO_2$ generated depends on the amount of the carbonaceous reductant contained in the agglomerates and the heating conditions.

The raw material mixture fed into the rotary hearth furnace is heated by the heat of combustion from the burner and by the radiant heat from the sidewalls and ceiling of the furnace. Since heat radiation is in proportional to a fourth power of the temperature, rapid heating and reduction are achieved. Iron oxide in the raw material mixture can be reduced into metallic iron by heating for a significantly short time, for example, for 6 to 12 minutes.

The heat received on the surface of the raw material mixture is transported toward the interior of the mixture by thermal conduction to promote the reactions represented by formulae (2) to (4). Preferably, the raw material mixture is agglomerate having a bulk density of at least 1.2 g/cm³ and more preferably 1.8 g/cm³ for promoting the heat conduction toward the interior of the raw material mixture.

The ratio of the iron oxide material to the carbonaceous reductant must be determined so that the solid carbon content (A), excluding the volatile components, in the carbonaceous reductant and the carbonaceous material is equal to or higher than the chemical equivalent required for reduction of iron oxide. Preferably, the ratio is determined in view of the heat of combustion required for melting in the melting furnace and a target carbon content in the molten iron formed by smelting reduction.

In the raw material mixture used in the present invention, the carbon content (A), excluding volatile components, in the carbonaceous reductant and carbonaceous material is preferably equal to or higher than the sum of the chemical equivalent necessary for reduction of iron oxide in the mixture, the target carbon content in the molten iron product, and an amount corresponding to the heat quantity necessary for melting of the solid reduced iron. The carbon content may be adjusted by at least one of (1) a carbonaceous reductant compounded in the raw material mixture to be fed into the heating reduction furnace, (2) a carbonaceous reductant compounded in the reduced iron that is produced in the heating reduction furnace and that is not yet fed into the melting furnace, and (4) the another carbonaceous material fed into the heating reduction furnace. When a large amount of carbonaceous material is compounded in the preparation step of the raw material mixture, the amount of the carbonaceous material added to the solid reduced iron prepared by smelt reduction and the amount of the carbonaceous material fed into the melting furnace may be appropriately reduced.

In the smelting reduction in the melting furnace, a CaO-containing material is preferably added to the melting furnace alone or in combination with the solid reduced iron so that the basicity of the by-product slag is at least 1.2. At a basicity of 1.2 or more, the sulfur components contained in the molten iron migrate toward the molten slag, and thus the resulting metallic iron contains reduced amounts of sulfur components.

As the FeO content in the by-product slag decreases, the distribution coefficient of the sulfur components in the slag increases and thus the sulfur content in the molten iron decreases. Since the FeO content decreases as the carbon content (B) increases in the molten iron, the carbon content (B) in the molten iron is preferably at least 2% and more preferably at least 3% to enhance the distribution coefficient of the sulfur components in the slag and thus to reduce the sulfur content in the molten iron. Since FeO erodes the lining refractory, such a reduction in Feo content is preferable in order to suppress the erosion. The carbon content (B)

in the molten iron may be adjusted by at least one of (1) a carbonaceous reductant compounded in the raw material mixture to be fed into the heating reduction furnace, (2) a carbonaceous reductant compounded in the reduced iron that is produced in the heating reduction furnace and that is not yet fed into the melting furnace, (3) a carbonaceous material supplied to the melting furnace, and (4) the another carbonaceous material fed into the heating reduction furnace.

In order to carry out smelting reduction in the melting furnace effectively, a key point is how the metallization of the iron source (reduced iron) fed into the melting furnace is increased. Thus, the metallization of the reduced iron must be increased in the rotary hearth furnace.

The heating condition of the raw agglomerates, therefore, must be adequately controlled in the rotary hearth furnace. Thus, the properties of the fuel gas for such heating must be stabilized as much as possible. When the gas generated in the melting furnace is used as fuel gas in the rotary hearth furnace, higher calorie enables rapid heating and facilitates temperature control in the rotary hearth furnace. This indicates that the secondary combustion ratio in the melting furnace is suppressed to reduce the $CO_2$ content. In order to ensure stable combustion at the burner for a long time, it is preferable that the dust volume in the fuel gas be minimized for preventing deposition of the dust on the feeding pipes and fuel gas burner and clogging of nozzles.

Equipment for cooling the gas from the melting furnace and removing the dust, therefore, is provided upstream of the rotary hearth furnace. It is preferable in the dust-removing process that the dust volume in the gas be 5 g/Nm$^3$ or less and more preferably 1 g/Nm$^3$ less. The operation temperature of the removing unit is preferably about 800° C. or less in view of heat resistance and safety of the unit.

The operation conditions of the melting furnace for smelting reduction of the solid reduced iron will now be described. The carbonaceous material fed into the iron bath in the melting furnace reacts with simultaneously supplied high-purity oxygen to form CO gas as shown in formula (5):

$$C + 1/2 O_2 \rightarrow CO \tag{5}$$

The CO gas is secondarily burned in a gas phase on the iron bath as shown in formula (6):

$$CO + 1/2 O_2 \rightarrow CO_2 \tag{6}$$

Since these reactions are exothermic, the heat is transported to the iron bath and is used for further reducing and melting the solid reduced iron.

Figure 2:
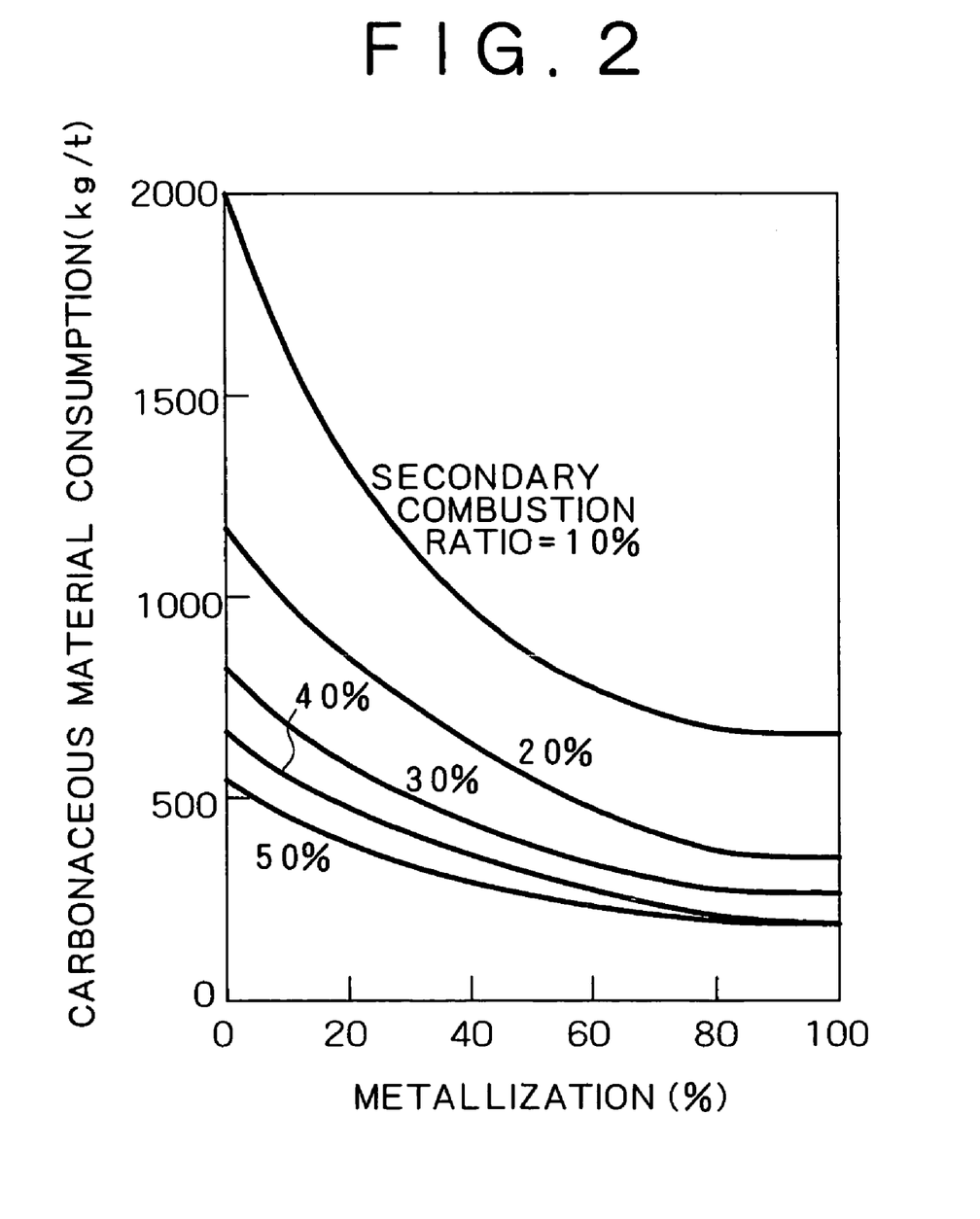
FIG. 2 is a graph showing the relationship between the consumption of the carbonaceous material and the metallization at various secondary combustion ratios in a melting furnace.
Figure 3:
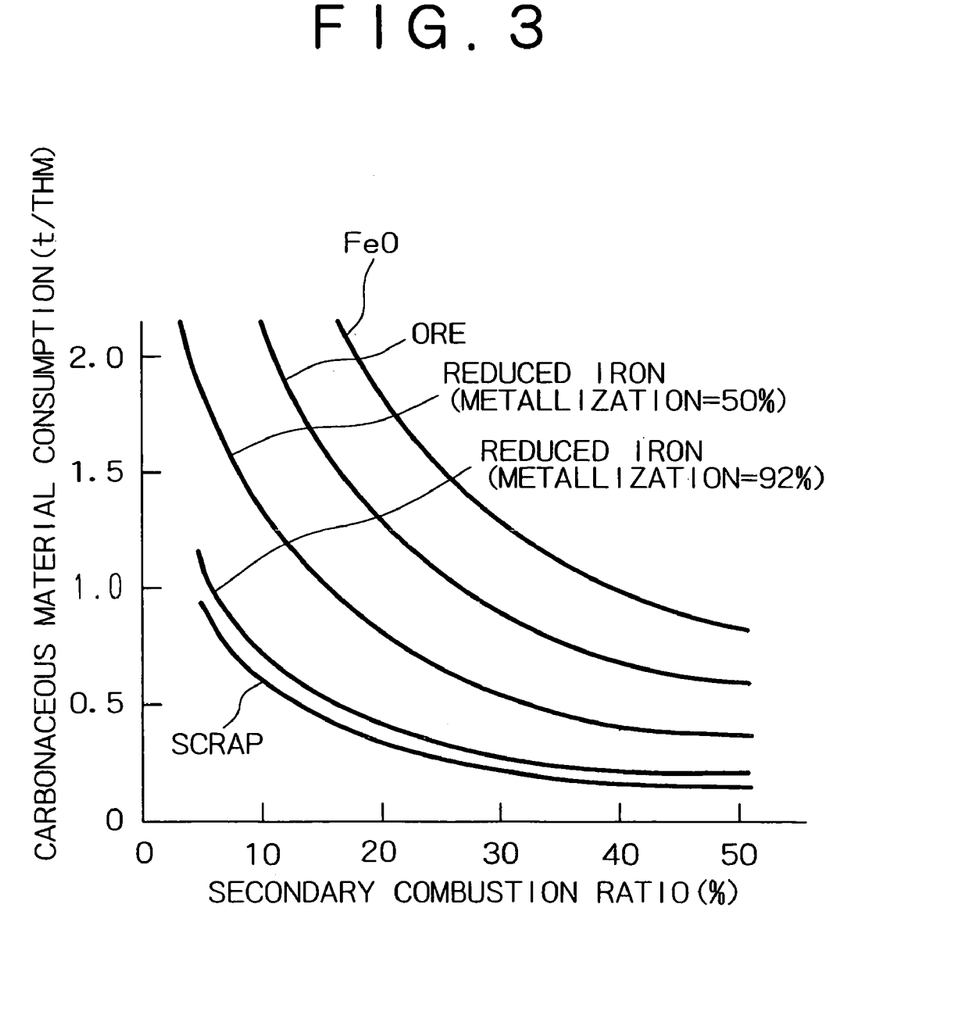
FIG. 3 is a graph showing the relationship between the consumption of the carbonaceous material and the secondary combustion ratio at various metallizations.

FIG. 2 is a graph showing the relationship between the consumption of the carbonaceous material and the metallization and FIG. 3 is a graph showing the relationship between the consumption of the carbonaceous material and the secondary combustion ratio. These graphs demonstrate that the consumption of the carbonaceous material decreases with an increase in the metallization of the fed iron source (FIG. 2) and with an increase in the secondary combustion ratio (FIG. 3).

FIG. 2 shows that the consumption of the carbonaceous material is saturated at a metallization of 60% or more for a secondary combustion ratio of 40% or less. This condition is significantly favorable in a stable operation since the consumption of the carbonaceous material is stable regardless of the metallization.

Accordingly, the metallization of the iron source (reduced iron) fed into the melting furnace is preferably increased as much as possible to at least 60%, more preferably at least 80%, and most preferably at least 90% that corresponds to a value for general iron scrap, for suppressing the consumption of the carbonaceous material and stable operation.

A metallization of at least 60% is achieved by, for example, adequately controlling the amount of the carbonaceous reductant added during the production of the raw material mixture and the heat reduction conditions in the rotary hearth furnace. Specifically, the carbonaceous reductant is added in a necessary and sufficient amount for reduction of the iron oxide in the preparation stage of the raw material mixture, the operational temperature of the rotary hearth furnace is between 1,100° C. and 1,400° C. and more preferably between the 1,250° C. and 1,350° C., and the holding time is at least 6 minutes and more preferably at least 8 minutes.

FIG. 3 shows that a higher secondary combustion ratio is preferable to effectively reduce the consumption of the carbonaceous material in the melting furnace and is more preferably at least 20%. At a secondary combustion ratio exceeding 40%, however, the consumption of the carbonaceous material is not further reduced. Accordingly, the secondary combustion ratio is preferably 40% or less and more preferably 30% or less.

The secondary combustion ratio varies with the carbonaceous material content and the oxygen gas content in the melting furnace. Thus, the amounts of the carbonaceous material and the oxygen gas are adequately controlled to achieve a secondary combustion ratio of 40% or less and more preferably 20% to 40%.

The secondary combustion increases the temperature of the gas phase in the melting furnace and has a severe thermal impact on the lining refractory. A reduced metallization in the iron source represents an increased unreduced iron oxide (FeO) content in the iron source and thus accelerated erosion of the lining refractory due to an increased FeO content in the molten slag. Water cooling, which is carried out for suppressing erosion of the refractory, causes heat loss that adversely affects the production efficiency and costs.

Agitation of the iron bath is effective for promoting the melting of the iron source (reduced iron) added to the melting furnace. Vigorous agitation, however, causes an increase in dust in the exhaust gas from the melting furnace up to about 100 g/Nm$^3$, resulting in reduced iron yield and clogging of the hot gas pipes due to deposition of the dust.

Accordingly, in the present invention, the metallization of the reduced iron fed into the melting furnace is increased to at least 60% and more preferably at least 80% to reduce the consumption of the carbonaceous material, and the secondary combustion ratio in the melting furnace is reduced to 40% or less, more preferably 20% to 40%, and most preferably 20% to 35% to prevent an excess increase in gas phase temperature and to reduce impact to the melting furnace.

The oxygen source fed into the melting furnace may be air. In such a case, however, nitrogen that contained in an amount four times oxygen is also heated, resulting in increased preheating loss and an increased volume of discharged gas. Accordingly, the oxygen source is preferably high-purity oxygen and more preferably high-purity oxygen gas containing at least 90% oxygen to enhance heat efficiency and to avoid an increased volume of the discharged gas. The high-purity oxygen can also reduce the formation of dust.

Figure 4:
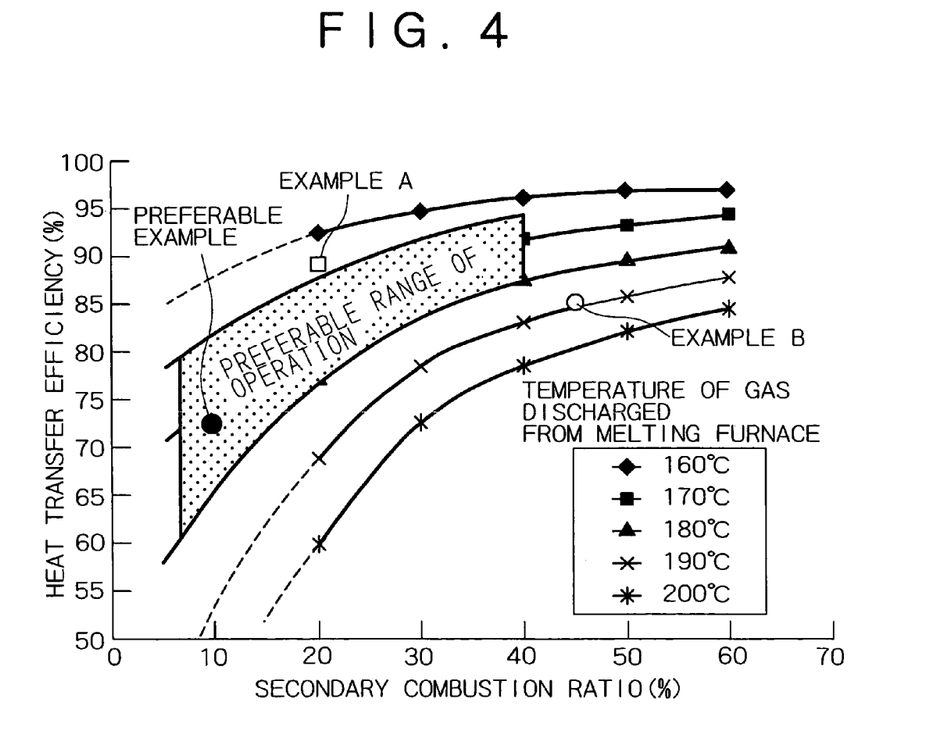
FIG. 4 is a graph showing the relationship between the heat transfer efficiency to molten iron in a melting furnace and the secondary combustion ratio at various temperatures of exhaust gas from the melting furnace.

FIG. 4 is a graph showing the relationship between the heat transfer efficiency and the secondary combustion ratio at various temperatures of exhaust gas from the melting furnace for comparison of the present invention with conventional examples.

FIG. 4 demonstrates that the exhaust gas temperature increases as the secondary combustion ratio increases at constant heat transfer efficiency and that an increased amount of heat is discharged without being used in the melting furnace. When the exhaust gas temperature is maintained at constant, the heat transfer efficiency increases with the secondary combustion ratio, showing effective use of heat. In EXAMPLE A in FIG. 4, scrap is used as the iron source fed into the melting furnace where the heat transfer efficiency is as high as 89% and the exhaust gas temperature is as low as about 1,650° C. at a secondary combustion ratio of 20%.

In EXAMPLE B, reduced iron having a metallization of 30% is used as the iron source fed into the melting furnace. Since the secondary combustion ratio is as high as about 45%, the exhaust gas temperature is 1,900° C. causing increased thermal impact to the lining refractory and the heat transfer efficiency is decreased to 85%. Since the metallization of the iron source is 30% in EXAMPLE B, the FeO content in the by-product slag formed during the smelting reduction increases, accelerating erosion of the lining refractory.

According to these results, the preferable conditions for operating the combined facilities including the heat reducing apparatus (rotary hearth furnace) and the melting furnace for smelting reduction of the reduced iron produced in the rotary hearth furnace are as follows: (1) the metallization in the rotary hearth furnace is increased to at least 60% and more preferably at least 80% to reduce residual FeO as much as possible; (2) the secondary combustion ratio in the melting furnace is controlled to be 40% or less and more preferably in the range of 20% to 40% so that the exhaust gas from the melting furnace has calorie that is necessary for fuel in the rotary hearth furnace; and (3) the secondary combustion ratio is suppressed to 40% or less to suppress an increase in the exhaust gas temperature and thus to suppress erosion of the lining refractory in the melting furnace. In FIG. 4, the hatched region represents the preferable conditions.

As shown in FIGS. 2 and 3, the amounts of the oxygen and the carbonaceous material fed into the melting furnace are controlled and the heat transfer efficiency of the secondary combustion to the molten iron is increased to at least 60% and more preferably at least 75% so that the metallization of the reduced iron in the rotary hearth furnace is increased to at least 60% and the secondary combustion ratio of CO gas generated in the melting furnace is reduced to 40% or less.

The heat transfer efficiency (Ef) of the heat of the secondary combustion to the molten iron is defined as follows:

$$Ef(\%) = \{1 - (H_3 + H_4 - H_2)/H_1\} \times 100$$

wherein $H_1$ is the heat of secondary combustion of CO and $H_2$ gases generated in the bath as represented by the following reactions:

$H_2$ is the sensible heat of gas generated in the bath, wherein the volume and the composition of the gas are calculated from the material balance and the temperature of the gas is assumed to be the same as the bath temperature;

$H_3$ is the sensible heat of gas discharged from the furnace; and $H_4$ is the heat loss at the gas phase in which the secondary combustion reaction occurs, the heat loss corresponding to 10% to 20% of the total heat input.

Under such conditions, the life of the lining refractory in the melting furnace is prolonged. When the melting furnace is of a stationary type, it can be operated for a long time without maintenance and repairing. However, in the present invention, a tilting type melting furnace may be used instead of the stationary melting furnace.

According to the present invention, in the production of molten iron by feeding a raw material mixture containing a carbonaceous reductant into a heating reduction furnace such as a rotary hearth furnace, reducing iron oxide in the mixture to form solid reduced iron, and further reducing and melting the reduced iron in a melting furnace, (1) the metallization of the solid reduced iron in the heating reduction furnace is increased to at least 60%;

(2) the amounts of oxygen and a carbonaceous material are controlled so that the secondary combustion ratio of CO generated in the melting furnace is reduced to 40% or less;

(3) the heat transfer efficiency of heat of the secondary combustion is increased to at least 60%; and (4) the melting furnace has an enclosed structure and all or part of the gas generated in the melting furnace is fed into the heating reduction furnace to heat the solid reduced iron in the melting furnace. Molten reduced iron having a carbon content of about 1.5% to 4.5% can thereby be produced with high productivity and high energy efficiency with suppressed deterioration of the heating reduction furnace and the melting furnace.

EXAMPLES

The present invention will now be described in further detail by EXAMPLES. According to the flow chart shown in FIG. 1, operations were carried out using raw ore and coal having compositions shown in Table 1 under conditions shown in Table 2. The results are also shown in Table 2.

TABLE 1

| Composition of Raw Materials (mass percent) | | |
|---|---|---|
| Iron ore | Total Fe | 68.18 |
| | | (Note) |
| | FeO | 0.01 |
| | $SiO_2$ | 0.83 |
| | $Al_2O_3$ | 0.47 |
| | CaO | 0.05 |
| Coal | Fixed carbon | 71.0 |
| | Volatile component | 19.8 |
| | Ash | 9.2 |

Note:
91.4% as $Fe_2O_3$; the balance is $TiO_2$, $Na_2O$, $K_2O$ etc.

TABLE 2

|  | Experiment | | | | | |
| --- | --- | --- | --- | --- | --- | --- |
|  | 1 | 2 | 3 | 4 | 5 | 6 |
| Iron ore (kg/ton product) | 1,410 | 1,410 | 1,411 | 1,411 | 1,411 | 1,410 |
| Coal (kg/ton product) | | | | | | |
| Amount as carbon | 459 | 459 | 459 | 459 | 459 | 459 |
| Amount as carbon fed into melting furnace | 105 | 111 | 111 | 124 | 73 | 211 |
| Oxygen injected into melting furnace ($Nm^3$/ton product) | 108 | 119 | 111 | 126 | 93 | 211 |
| Secondary combustion ratio in melting furnace (%) | 30.0 | 30.0 | 28.0 | 30.0 | 50.0 | 10 |
| Heat transfer efficiency in melting furnace (%) | 84.6 | 89.3 | 88.7 | 73.1 | 85.0 | 72.5 |
| Metallization in rotary hearth furnace (%) | 90 | 90 | 90 | 90 | 90 | 90 |
| Amount of auxiliary fuel supplied into rotary hearth furnace ($Nm^3$/ton product) | 6 | 0 | 0 | 0 | 39.0 | 0 |
| Excess gas generated in melting furnace ($Nm^3$/ton product) | 0 | 3 | 0 | 36 | 0 | 0 |
| Carbon content in molten iron (%) | 3 | 3.2 | 2.8 | 3.8 | 2.3 | 4.5 |
| Dust volume in exhaust gas from melting furnace (g/$Nm^3$) | 1.0 | 4.0 | 3.2 | 5.4 | 3.1 | 5.0 |
| Oxygen purity percent of oxygen gas blown into melting furnace (%) | 99.8 | 99.8 | 99.8 | 99.8 | 99.8 | 99.8 |

In Experiments 1 to 3 shown in Table 2, the metallization of the reduced iron produced in the rotary hearth furnace was maintained at 90%, the secondary combustion ratio in the melting furnace was maintained at 40% or less, and the heat transfer efficiency was maintained at 60% to 90%. In Experiment 1, all the gas generated in the melting furnace was introduced into the rotary hearth furnace and an auxiliary fuel (natural gas) supplied a deficiency of calorie.

In Experiment 2, the heat transfer efficiency and gas generation were enhanced so that no auxiliary fuel was used in the rotary hearth furnace. Although the dust volume in the exhaust gas from the melting furnace slightly increased but did not disturb the operation. A slightly excess amount of exhaust gas, which could be used as an external heat source, was generated in the melting furnace.

In Experiment 3, all process parameters were optimized not to use the auxiliary fuel and not to generate the excess gas from the melting furnace. An energy-closed operation in view of energy was achieved in a combination of the rotary hearth furnace and the melting furnace.

In Experiment 4, the secondary combustion ratio was as low as 30%. Since the heat transfer efficiency to the molten iron in the melting furnace was 73% that was a somewhat low level, the amounts of coal and oxygen used were increased. Thus, the excess gas and the dust concentration also slightly increased. In Experiment 6, the carbonaceous material fed into the melting furnace was increased to increase the carbon content in the molten iron to a saturated carbon content. According to the present invention, the carbon content in the molten iron can be increased to a saturated content by adjusting the carbon content fed into the melting furnace.

In Experiment 5, the secondary combustion ratio in the melting furnace was excessively increased. Although the heat transfer efficiency is enhanced, the volume of the exhaust gas fed into the heating reduction furnace and the quantity of heat (reducing potential) were decreased. As a result, the rotary hearth furnace required additional burning using auxiliary fuel.

These results show that optimization of the operation conditions allows production of high-purity molten iron with high energy efficiency and high productivity through a series of stable operations from solid reduction to smelting reduction without excess thermal impact to the melting furnace. As shown in Experiment 3, an energy-closed operation in view of energy was achieved using these molten iron production facilities.

In production of molten iron according to Experiment 3, an additional carbonaceous material for heating the melting furnace and calcium oxide (CaO) were added so that the basicity (CaO/$SiO_2$ ratio) of the product slag was in the range of 1.5 to 1.6. The sulfur content of the molten iron was determined. In the initial stage of the operation, the sulfur content gradually increased and reached about 0.04 mass percent 40 minutes later. The sulfur content was saturated at 0.04 mass percent thereafter. Probably, an increased basicity due to addition of CaO promotes migration of sulfur from the molten iron to the slag.

INDUSTRIAL APPLICABILITY

The method for making molten iron according to the present invention can effectively produce molten iron with reduced energy compared with conventional methods. This method suppresses damaging of the refractory and provides elasticity of production in an iron making process.

The invention claimed is:

1. A method for making molten iron, comprising the steps of:
    feeding a raw material mixture containing an iron oxide material and a carbonaceous reductant into a rotary hearth furnace to reduce iron oxide in the raw material mixture with the carbonaceous reductant into solid reduced iron;
    transporting the solid reduced iron to a melting furnace; and
    combustion of a carbonaceous material supplied as fuel to melt the solid reduced iron in the melting furnace for producing molten iron,
    wherein
        when the metallization of the solid reduced iron is enhanced to a range of 60% to 80%, the solid reduced iron is transported to the melting furnace, and amounts of oxygen and the carbonaceous material supplied to the melting furnace are controlled so that the secondary combustion ratio of CO gas in the melting furnace is reduced to a range of 20% to 40%; and when the metallization of the solid reduced iron is enhanced to a range of more than 80%, the solid reduced iron is transported to the melting furnace, and amounts of oxygen and the carbonaceous material supplied to the melting furnace are controlled so that the secondary combustion ratio of CO gas in the melting furnace is reduced to a range of 40% or less.

2. The method according to claim 1, wherein air is preheated by using the heat of exhaust gas from the rotary hearth furnace and is used as combustion air in the rotary hearth furnace and/or used for drying the raw material mixture or raw materials.

3. The method according to claim 1, wherein a carbon content (A), excluding volatile components, in the carbonaceous reductant and carbonaceous material is equal to or higher than the sum of the chemical equivalent necessary for reduction of iron oxide in the raw material mixture, a target carbon content in the molten iron product, and an amount corresponding to the heat quantity necessary for melting of the solid reduced iron.

4. The method according to claim 3, wherein the carbon content (A) is adjusted by at least one of the carbonaceous reductant compounded into the raw material mixture to be fed into the rotary hearth furnace, a carbonaceous reductant compounded into the reduced iron that is produced in the rotary hearth furnace, and the carbonaceous material supplied to the melting furnace.

5. The method according to claim 1, wherein high-purity oxygen gas containing at least 90% oxygen is supplied to the melting furnace by bottom blowing, top blowing, or side blowing for agitating a slag layer in the melting furnace.

6. The method according to claim 1, wherein the heat transfer efficiency of the secondary combustion heat to the molten iron is increased to at least 60%.

7. The method according to claim 1, wherein the solid reduced iron, the carbonaceous material, and a flux for adjusting the slag compositions are fed from the top of the melting furnace by gravity.

8. The method according to claim 1, wherein inert gas is injected into the molten iron in the melting furnace to agitate the molten iron.

9. The method according to claim 1, wherein the melting furnace is of a stationary type or tilting type.

10. The method according to claim 9, wherein the melting furnace is of a stationary type, and has a tap hole in a sidewall for discharging the molten iron and molten slag at a height from which an inert gas cannot be blown over a slag layer.

11. The method according to claim 1, wherein the iron oxide material includes iron oxide and a nonferrous metal or its oxide.

12. The method according to claim 1, wherein the iron oxide material includes material generated from a metal refining facility.

13. The method according to claim 1, wherein a CaO-containing material is added such that the basicity of a slag formed in the melting furnace is at least 1.2 and sulfur components in the molten iron are thereby transferred to the molten slag.

14. The method according to claim 1, wherein a carbon content (B) in the molten iron is at least 2 mass percent.

15. The method according to claim 1, wherein the solid reduced iron produced in the rotary hearth furnace is immediately transported and discharged to the melting furnace for melting.

16. The method according to claim 1, wherein the solid reduced iron produced in the rotary hearth furnace is transported substantially without cooling to the melting furnace for melting.

17. The method according to claim 1, wherein the solid reduced iron produced in the rotary hearth furnace is stored and then is transported to the melting furnace for melting.

18. The method according to claim 1, wherein at least part of a gas generated in the melting furnace is fed into the rotary hearth furnace and is used as a heat source.

19. The method according to claim 18, wherein the gas generated in the melting furnace is cooled, is subjected to dust removal to reduce the dust volume to about 5 g/Nm$^3$ or less, and then is fed into the rotary hearth furnace.

20. The method according to claim 1, wherein at least part or all of the carbonaceous material and/or another carbonaceous material is fed into the rotary hearth furnace.

21. The method according to claim 20, wherein at least part or all of the carbonaceous material and/or another carbonaceous material is fed into the rotary hearth furnace, is heated, and then fed to the melting furnace together with the solid reduced iron.

22. The method according to claim 20, wherein a carbon content (B) in the molten iron is adjusted by at least one selected from the carbonaceous reductant compounded in the raw material mixture fed into the rotary hearth furnace, the another carbonaceous material fed into the rotary hearth furnace, the carbonaceous reductant compounded in the reduced iron produced in the rotary hearth furnace, and the carbonaceous material fed into the melting furnace.

23. The method according to claim 1, wherein when the metallization of the solid reduced iron is enhanced to at least 60%, the solid reduced iron is transported to the melting furnace, and amounts of oxygen and the carbonaceous material supplied to the melting furnace are controlled so that the secondary combustion ratio of CO gas in the melting furnace is reduced to a range of 20% to 40%.

24. The method according to claim 1, wherein, when the raw material mixture is fed into the rotary hearth furnace, the rotary hearth furnace is at a temperature in a range of from 1100° C. to 1400° C.

* * * * *